(12) United States Patent
Zhou (10) Patent No.: US 11,176,418 B2
(45) Date of Patent: Nov. 16, 2021

(54) MODEL TEST METHODS AND APPARATUSES (71) Applicant: Advanced New Technologies Co., Ltd., George Town (KY)

(72) Inventor: Jun Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/886,609

(22) Filed: May 28, 2020

(65) Prior Publication Data
US 2020/0293892 A1 Sep. 17, 2020

Related U.S. Application Data (63) Continuation of application No. PCT/CN2019/075438, filed on Feb. 19, 2019.

(30) Foreign Application Priority Data

May 10, 2018 (CN) .......................... 201810443821.0

(51) Int. Cl.
*G06K 9/62* (2006.01)
*G06N 20/20* (2019.01)
(Continued)

(52) U.S. Cl.
CPC ......... *G06K 9/6256* (2013.01); *G06N 3/0454* (2013.01); *G06N 3/08* (2013.01);
(Continued)

(58) Field of Classification Search
None
See application file for complete search history.

(56) References Cited

U.S. PATENT DOCUMENTS 7,130,834 B2 * 10/2006 Anderson ................ G06K 9/62
706/15
7,814,036 B2 10/2010 Chen et al.
(Continued)

FOREIGN PATENT DOCUMENTS

CN 102567391 7/2012
CN 103743980 4/2014
(Continued)

OTHER PUBLICATIONS

Machine Translation for CN108615071A (Year: 2018).*
(Continued)

*Primary Examiner* — Catherine T. Rastovski
*Assistant Examiner* — Leonard S Liang
(74) *Attorney, Agent, or Firm* — Fish & Richardson P.C.

(57) ABSTRACT

A sample is obtained from a test sample set. The sample is input into a plurality of models included in a model set that are to be tested, where the plurality of models include at least one neural network model. A plurality of output results are obtained, including obtaining, from each model of the plurality of models, a respective output result. A test result is determined based on the plurality of output results, where the test result includes at least one of a first test result or a second test result, where the first test result includes a plurality of output result accuracies. In response to determining that the test result does not satisfy a predetermined condition, a new sample is generated based on the sample and a predetermined rule, and the new sample is added to the test sample set.

18 Claims, 4 Drawing Sheets

(51) Int. Cl.
  G06N 3/04 (2006.01)
  G06N 3/08 (2006.01)
  G06Q 10/04 (2012.01)
(52) U.S. Cl.
  CPC .............. G06N 20/20 (2019.01); *G06K 9/62* (2013.01); *G06K 9/6217* (2013.01); *G06Q 10/04* (2013.01)

(56) References Cited

U.S. PATENT DOCUMENTS

| | | | |
|---|---|---|---|
| 10,013,656 | B1* | 7/2018 | Ciarlini ...................... G06F 9/46 |
| 2003/0225719 | A1* | 12/2003 | Juang ....................... G10L 17/04 706/48 |
| 2004/0002930 | A1* | 1/2004 | Oliver ................... G10L 15/144 706/46 |
| 2004/0257240 | A1 | 12/2004 | Chen et al. |
| 2006/0230006 | A1* | 10/2006 | Buscema ............. G06N 3/0454 706/13 |
| 2010/0042404 | A1 | 2/2010 | Gupta et al. |
| 2016/0307098 | A1* | 10/2016 | Goel ..................... G06N 3/0454 |
| 2016/0342861 | A1* | 11/2016 | Tuzel .................... G06K 9/6256 |
| 2017/0200092 | A1* | 7/2017 | Kisilev ................. G06K 9/4628 |
| 2018/0285731 | A1* | 10/2018 | Heifets .................... G16B 40/00 |
| 2018/0307969 | A1* | 10/2018 | Shibahara ............... G06F 17/16 |
| 2018/0314975 | A1* | 11/2018 | Zang ....................... G06N 20/00 |
| 2018/0365525 | A1* | 12/2018 | Zhang .................... G06F 16/00 |
| 2019/0156216 | A1* | 5/2019 | Gupta .................... G06N 5/045 |
| 2020/0019852 | A1* | 1/2020 | Yoon ..................... G06N 3/0454 |

FOREIGN PATENT DOCUMENTS

| | | |
|---|---|---|
| CN | 105260786 | 1/2016 |
| CN | 105868769 | 8/2016 |
| CN | 106022215 | 10/2016 |
| CN | 106408016 | 2/2017 |
| CN | 106485192 | 3/2017 |
| CN | 106503795 | 3/2017 |
| CN | 107133436 | 9/2017 |
| CN | 107438842 | 12/2017 |
| CN | 107563280 | 1/2018 |
| CN | 107590565 | 1/2018 |
| CN | 108615071 | 10/2018 |
| WO | WO0236812 | 5/2002 |

OTHER PUBLICATIONS

Machine Translation for CN107590565A (Year: 2018).*
Chapter 7, "Artificial Neural Networks" from Data Mining: Concepts, Models, Methods, and Algorithms, Second Edition, Mehmed Kantardzic. Published 2011 by John Wiley & Sons, Inc. (Year: 2011).*
Ma, Lei; Juefei-Xu, Felix; Zhang, Fuyuan; Sun, Jiyuan; Xue, Minhui; Li, Bo; Chen, Chunyang; Su, Ting; Li, Li; Yang, Liu, Zhao, Jianjun; and Wang, Yadong—DeepGauge: Multi-Granularity Testing Criteria for Deep Learning Systems; ASE '18, Sep. 3-7, 2018. (Year: 2018).*
Yu, Chen; Chang, Kang; Chen, Bin; Chen, Jiaxin; Xie, Yunyun; Li, Gongxin—BP Neural Network Based Fault Prediction of Distribution Network during Typhoon Disaster; 2019 IEEE PES Innovative Smart Grid Technologies Asia. (Year: 2019).*
Skaar, Jan-Eirik W.; Stasik, Alexander J.; Hagen, Espen; Ness, Torbjorn V.; Einevoll, Gaute T.—Estimation of neural network model parameters from local field potentials (LFPs); (2020); PLoS Comput Biol 16(3): e1007725. (Year: 2020).*
Li, Zenan; Ma, Xiaoxing; Xu, Chang; and Cao, Chun—"Structural Coverage Criteria for Neural Networks Could Be Misleading"; 2019 IEEE/ACM 41st International Conference on Software Engineering: New Ideas and Emerging Results. (Year: 2019).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/075438, dated Apr. 24, 2019, 10 pages (with partial English translation).
Pei et al., "DeepXplore: Automated Whitebox Testing of Deep Learning System," SOSP'17: Proceedings of the 26th Symposium on Operating Systems Principles, pp. 1-18.
PCT International Preliminary Report on Patentability in International Application No. PCT/CN2019/075438, dated Nov. 10, 2020, 10 pages (with English translation).
Sohu.com [online], "Academia New research proposes DeepXplore: the first white box framework for systematic testing of real-world deep learning systems," May 22, 2017, retrieved on Dec. 4, 2020, retrieved from URL<https://www.sohu.com/a/142539796_465975>, 29 pages (with machine translation).
Xin et al., "Personal Recommendation algorithm with customer preference model and BP neural networks," Computer Engineering and Applications, Dec. 31, 2013, 49(2):57-60 (with English abstract).
Principles and Methods of Geological Information System, 1st ed., Geological Publishing House, Jan. 2016, pp. 305-307 (with English translation).
Extended Search Report in European Application No. 19799244.9, dated Mar. 12, 2021, 10 pages.
Tian et al. "DeepTest: Automated Testing of Deep-Neural-Network-driven Autonomous Cars," ICSE '18, Aug. 29, 2017, 12 pages.

* cited by examiner

MODEL TEST METHODS AND APPARATUSES

CROSS-REFERENCE TO RELATED APPLICATIONS

This application is a continuation of PCT Application No. PCT/CN2019/075438, filed on Feb. 19, 2019, which claims priority to Chinese Patent Application No. 201810443821.0, filed on May 10, 2018, and each application is hereby incorporated by reference in its entirety.

TECHNICAL FIELD

One or more implementations of the present specification relate to the field of computer technologies, and in particular, to methods and apparatuses for performing model tests by using computers.

BACKGROUND

With the development of computer and artificial intelligence technologies, increasing artificial neural networks (ANN) applications emerge, such as pattern recognition, automatic control, signal processing, and assistant decision-making. An ANN is an operation model that includes a large quantity of interconnected processing units (also referred to as neurons). Each processing unit represents a specific output function that is referred to as activation function (activation function). A performance test on a neural network model is often measured by a code coverage rate of a system that generates the neural network model, or an output accuracy of the neural network model on a sample set and an output result accuracy in a special case (for example, in a certain place with a temperature −70° C.) that a sample is difficult to cover.

In conventional technologies, a large quantity of training samples usually need to be collected to test models more adequately. In addition, more training samples often need to be collected to train the models and adjust and improve model parameters, so as to improve accuracies of the models. However, in such a method, the samples are collected manually and manpower is wasted. Moreover, the collected training samples are limited, and it cannot be ensured that the models are adequately tested, and improvement to accuracies of the models is limited. For example, if a temperature has never dropped below −70° C. in a certain place, no quantity of collected samples can cover a case with a temperature below −70° C. Particularly, in some special cases, for example, a case of a self-driving vehicle facing a truck with a white background, if such a case is not covered by collected test samples, the background may be identified as a sky background and decision-making is affected, thereby causing an unrecoverable loss.

Therefore, an improved solution is expected, so as to effectively perform model tests by generating more different samples. Such a solution not only can reduce manpower waste caused by manual sample collection but also can further test models by using these different samples. Moreover, the solution can be used to train the models to improve a model accuracy.

SUMMARY

One or more implementations of the present specification describe model test methods and apparatus, so as to effectively perform model tests by generating more different samples. Such practice not only can reduce manpower waste caused by manual sample collection but also can further test models by using these different samples. Moreover, an expanded test sample set can be used to train the models to improve a model accuracy.

According to a first aspect, a model test method is provided, including: obtaining a sample from a test sample set; input the sample into a plurality of to-be-tested models included in a model set to obtain output results of the to-be-tested models, where the plurality of to-be-tested models include at least one neural network model; determining a test result based on the output results, where the test result includes at least one of a first test result or a second test result, the first test result includes output result accuracies corresponding to the to-be-tested models, and the second test result includes a neuron coverage rate of the at least one neural network model; and when the test result does not satisfy a predetermined condition, generating a new sample based on the sample and a predetermined rule, and adding the new sample to the test sample set.

According to an implementation method of the first aspect, when the test result includes the first test result, the determining a test result based on the output results includes: determining, through voting, a correct output result for to-be-tested models with a same function included in the plurality of to-be-tested models, where an output result with the largest quantity of votes is the correct output result; and determining that an output result of a to-be-tested model whose output result is the correct output result is accurate.

In a possible design, the model set includes a standard model, and the determining a test result based on the output results includes: determining, based on an output result of the standard model, a correct output result of a to-be-tested model that has a same function as the standard model; and determining that an output result of a to-be-tested model whose output result is the correct output result is accurate.

Further, in an implementation, the predetermined condition includes: the output result accuracies corresponding to the plurality of to-be-tested models each are greater than a predetermined accuracy threshold.

According to an implementation method of the first aspect, when the test result includes the second test result, the determining a test result based on the output results includes: counting a quantity of covered neurons of each neural network model based on whether an output of each neuron in the at least one neural network model satisfies an output condition, where the quantity of covered neurons includes a quantity of neurons that satisfy the output condition in a test process; and determining a neuron coverage rate of each neural network model based on the quantity of covered neurons, where the neuron coverage rate is positively correlated with a ratio of the quantity of covered neurons to a total quantity of neurons.

Further, in an implementation, the predetermined condition includes: the neuron coverage rate of the at least one neural network model each is greater than a predetermined coverage rate threshold.

In an implementation, the generating a new sample based on the sample and a predetermined rule includes: obtaining a specified range of each feature in the sample; and adding a random error term to the sample based on the specified range of each feature to generate the new sample.

According to a possible design, the method further includes one or more of the following: removing a to-be-tested model whose test result satisfies the predetermined condition from the model set; and adding a new to-be-tested model to the model set.

According to a second aspect, a model test apparatus is provided, including: an acquisition unit, configured to obtain a sample from a test sample set; a test unit, configured to input the sample into a plurality of to-be-tested models included in a model set to obtain output results of the to-be-tested models, where the plurality of to-be-tested models include at least one neural network model; a determining unit, configured to determine a test result based on the output results, where the test result includes at least one of a first test result or a second test result, the first test result includes output result accuracies corresponding to the to-be-tested models, and the second test result includes a neuron coverage rate of the at least one neural network model; and a generation unit, configured to, when the test result does not satisfy a predetermined condition, generate a new sample based on the sample and a predetermined rule, and add the new sample to the test sample set.

According to a third aspect, a computer-readable storage medium is provided, where the computer-readable storage medium stores a computer program, and when the computer program runs on a computer, the computer is enabled to perform the method according to the first aspect.

According to a fourth aspect, a computing device is provided, and includes a memory and a processor, where the memory stores executable code, and when the processor executes the executable code, the method according to the first aspect is implemented.

According to the model test methods and apparatuses provided in the implementations of the present specification, a sample is first obtained from a test sample set; next, the sample is input into a plurality of to-be-tested models included in a model set to obtain output results of the to-be-tested model; subsequently, a test result is determined based on the output results; and further, when the test result does not satisfy a predetermined condition, a new sample is generated based on the sample and a predetermined rule, and the new sample is added to the test sample set. As such, when the model test method is cyclically executed, on one hand, accuracies and/or test adequacy of the to-be-detected models can be evaluated, and on the other hand, a new sample that is generated based on the original sample and that is different from the original sample can be used to improve effectiveness of a model test. Such practice not only can reduce manpower waste caused by manual sample collection but also can further test models. Moreover, an expanded test sample set can be used to train the models to improve a model accuracy.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
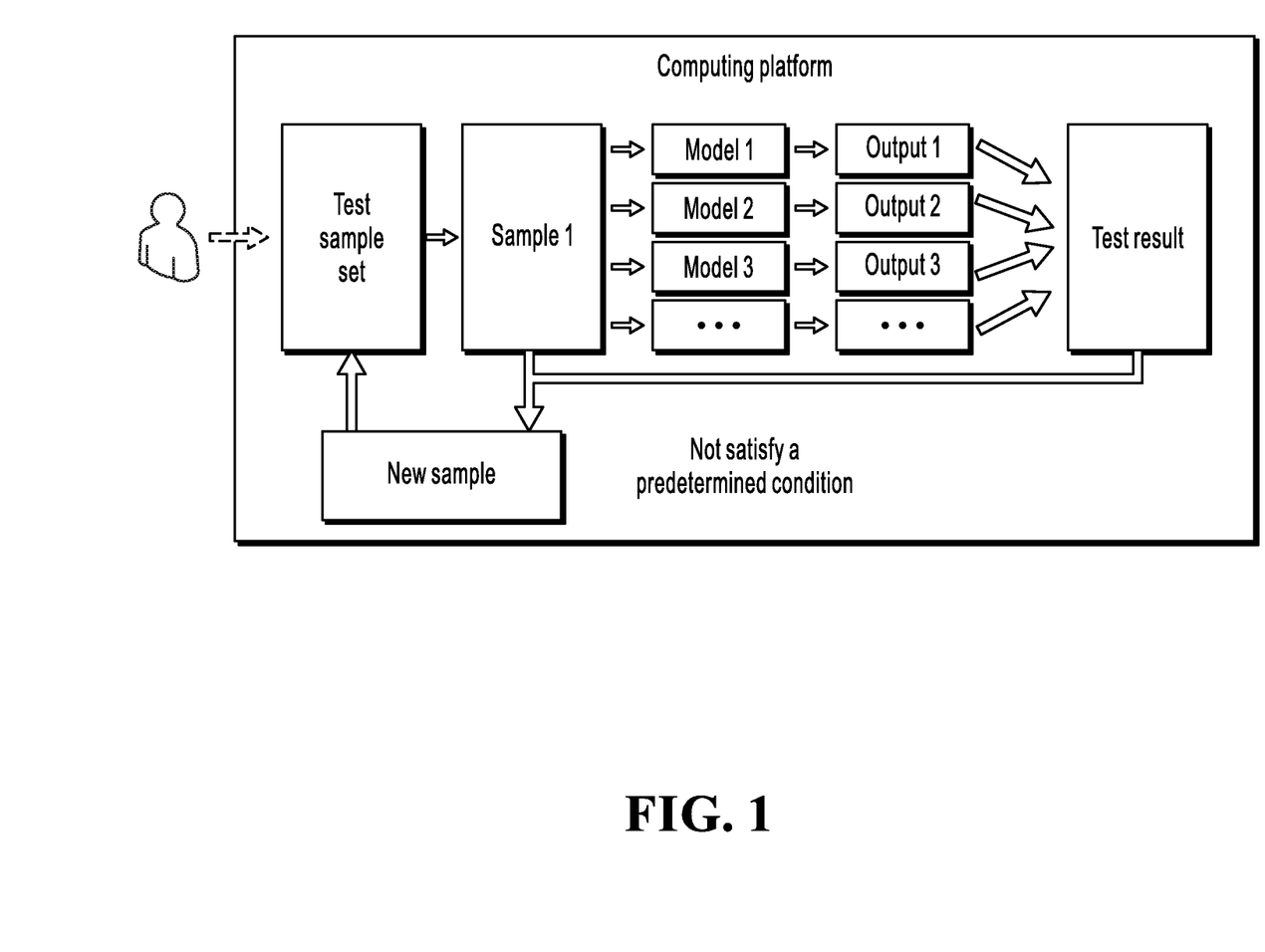
FIG. 1 is a schematic diagram illustrating an implementation scenario, according to an implementation of the present specification.

FIG. 1 is a schematic diagram illustrating an implementation scenario, according to an implementation of the present specification. As shown in the figure, users (such as application developers and test personnel) can test neural network models through a computing platform before they are formally used. The computing platform here can be various apparatuses and devices that have a data processing capability and a data input function, such as a desktop computer and a server. It can be understood that the computing platform can further be a device cluster formed by the previous electronic devices. The users can collect samples as an initial test sample set and input the samples to the computing platform.

During the test, the computing platform can obtain a sample from the test sample set, for example, sample 1, and then input sample 1 to a plurality of to-be-tested models included in a model set, for example, model 1, model 2, and model 3, and obtain output results of the test models, which are correspondingly output 1, output 2, and output 3, etc. It can be understood that the plurality of models can have a similar function (a predetermined function), so that sample 1 can be used simultaneously for testing of model 1, model 2, model 3, etc., which, for example, all have a pattern identification function. As such, sample 1 can be simultaneously input to the plurality of models, and the plurality of models separately can provide respective output results, for example, pattern identification output results. Because accuracies of models are different, output results of to-be-tested models with a same function can be the same or different. It should be noted that, these to-be-tested models include at least one neural network model.

Then, the computing platform can determine a test result based on the output results of the models. Here, the test result can include at least one of a first test result or a second test result. The first test result includes output result accuracies corresponding to the to-be-tested models, and the second test result includes a neuron coverage rate of the at least one neural network model. Here, the neuron coverage rate can be used to indicate a neuron activation status of a model. As such, for each to-be-tested model, performance of the model can be evaluated by using the output result accuracies. On the other hand, through the neuron coverage rate, it can be determined whether the model is adequately tested.

It can be understood that before the test, the users (such as application developers and test personnel) can further set a related condition as a predetermined condition for the test result, so as to control an end time of the test. For example, a predetermined condition that accuracies of all to-be-tested models are qualified can be set to control ending of the test process, etc. If the test process is not ended, the computing platform can obtain other samples from the test sample set and execute the above test process cyclically. In addition, because a quantity of samples in the original test sample set is limited, if the test process further needs to be cyclically executed, the computing platform can generate a new sample based on a predetermined rule and sample 1 that is used in the current test process, and add the new sample to the test sample set for use in a subsequent test process. The users (such as application developers and test personnel) can control generation of samples by setting predetermined rules, so it can be ensured that various cases are covered without going far beyond an actual case.

As such, accuracies and/or test adequacy of the to-be-detected models can be evaluated, and on the other hand, a new sample that is generated based on the original sample and that is different from the original sample can be added to the test sample set, so that the quantity of samples in the test sample set and covered cases can be increased. With these different samples automatically generated, not only manpower waste caused by manual sample collection can be reduced but also the models can further be tested. Moreover, an expanded test sample set can be used to train the models to improve a model accuracy. The following describes a specific execution process of the previous scenario.

Figure 2:
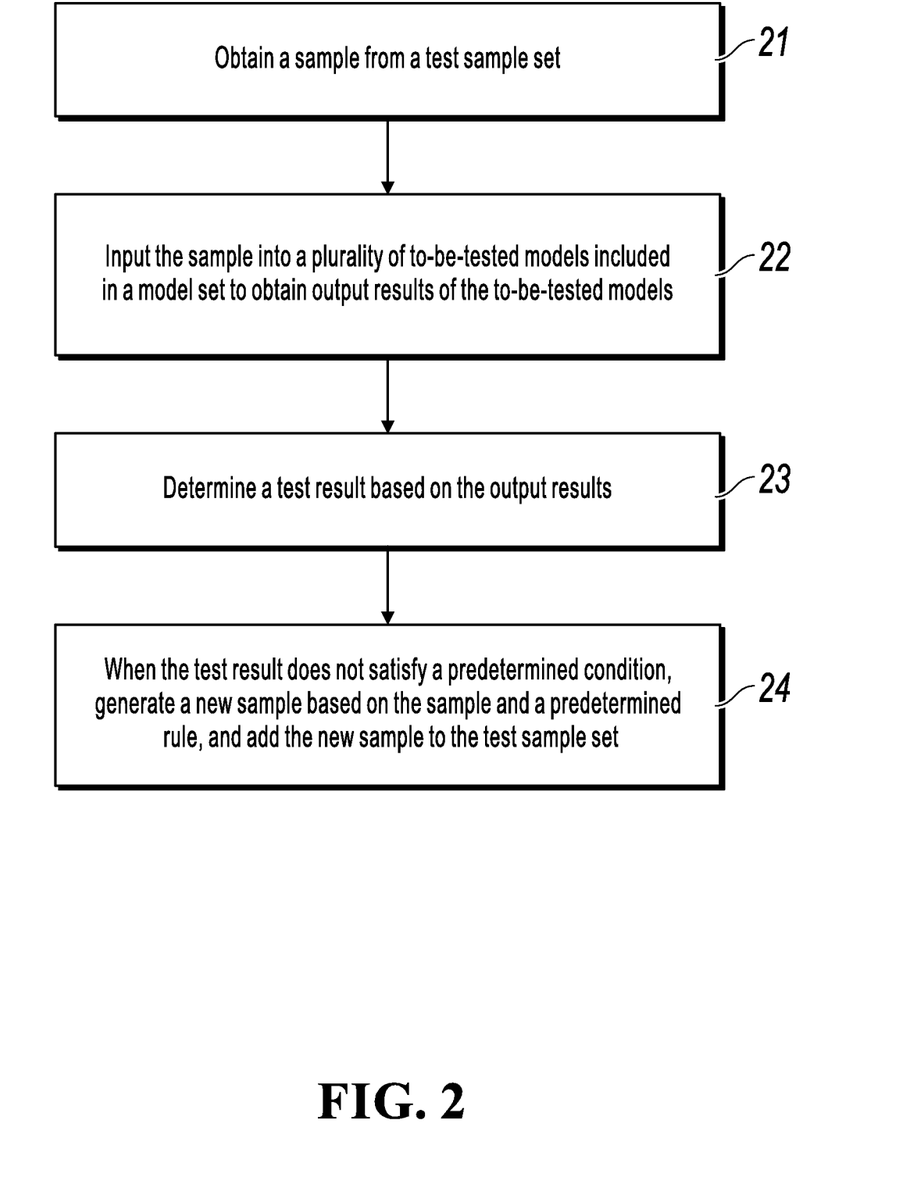
FIG. 2 is a flowchart illustrating a model test method, according to an implementation.

FIG. 2 is a flowchart illustrating a model test method, according to an implementation. The method can be executed by any system, device, apparatus, platform, or server that has computing and processing capabilities, for example, the computing platform shown in FIG. 1. As shown in FIG. 2, the method includes the following steps: Step 21: Obtain a sample from a test sample set. Step 22: Input the sample into a plurality of to-be-tested models included in a model set to obtain output results of the to-be-tested models, where the plurality of to-be-tested models include at least one neural network model. Step 23: Determine a test result based on the output results, where the test result includes at least one of a first test result or a second test result, the first test result includes output result accuracies corresponding to the to-be-tested models, and the second test result includes a neuron coverage rate of the at least one neural network model. Step 24: When the test result does not satisfy a predetermined condition, generate a new sample based on the sample and a predetermined rule, and add the new sample to the test sample set.

First, in step 21, a sample is obtained from the test sample set. It can be understood that the test sample set is used to store samples used for model tests. The test sample set can be a collection, or can be a database. No limitation is imposed in this application.

When the model test method is executed for the first time, the test sample set is an initial test sample set. The samples stored in the initial test sample set can include samples collected by a user, or can include samples collected by a user and samples generated in historical model test processes.

According to an implementation method, the user can filter the collected samples to select some samples prone to error in the models or samples with a low sample feature proportion, and place the samples into the initial test sample set. For example, when a sample is input into 10 different models for image recognition, output results of five models is a truck, and output results of the other five models is blue sky. In this case, the sample is prone to an error and can be selected. For another example, in 100 collected samples, 90 samples have a temperature ranging from 0° C. to 20° C., 4 samples have a temperature less than and near 0° C. (for example, higher than −3° C.), and 1 sample has a temperature of −10° C. In this case, the sample with the temperature of −10° C. occupies a low proportion and can be selected. The 4 samples with the temperature less than and near 0° C. can all be selected, or one or two of them can be selected. As such, missing of some special cases can be reduced, which helps samples in the test sample set to evenly cover various cases.

A sample can be obtained from the test sample set in any feasible way. In an implementation, a sample can be obtained based on a sorting sequence of the samples in the test sample set. For example, the first sample can be obtained when the model test method is executed for the first time, the second sample can be obtained when the model test method is executed for the second time, and so on.

In another implementation, a sample can be randomly obtained from in the test sample set. When the sample is randomly obtained, after the model test method is executed a plurality of times, it is possible that some samples have been frequently used, and some samples have not been used or have been less frequently used. In this case, a sample retrieval weight can further be set, to be specific, a higher retrieval weight can be set for a sample with a smaller quantity of use times, so as to increase a use probability for a sample that has not been used or has been less frequently used.

In more implementations, the user can also obtain the sample from the test sample set in more feasible ways.

Next, in step 22, the sample is input to the plurality of to-be-tested models included in the model set, so as to obtain the output results of the to-be-tested models. It should be noted that the model here is an operation model used to reveal a causal relationship between variables, and the operation model can include an algorithm including one or a series of functions. An output result determined by input variables can be obtained based on these variables by using such an algorithm, for example, an error back propagation (BP) algorithm or a convolutional neural network (CNN).

Figure 3:
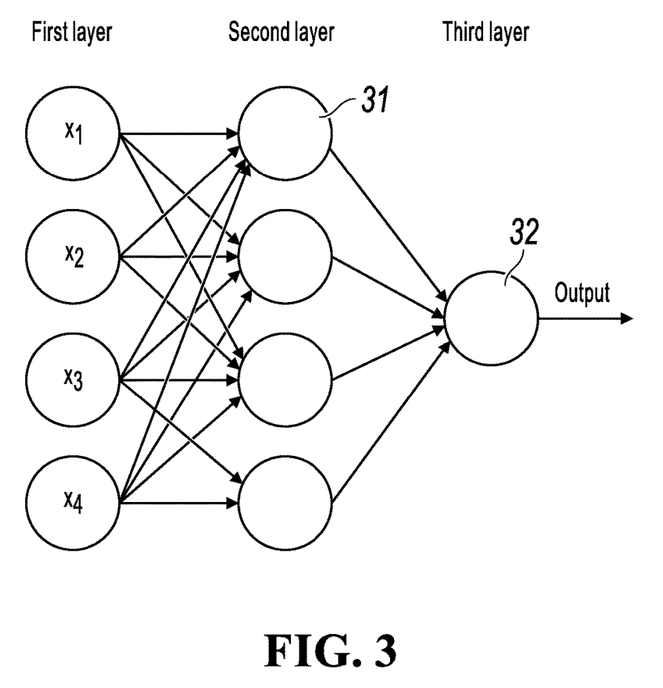
FIG. 3 illustrates a specific example of a neural network model.

A relatively complex case can be implemented by using a neural network model. The neural network model includes a plurality of neurons. As shown in FIG. 3, FIG. 3 illustrates a specific example of a neural network model with a three-layer structure. The neural network model in FIG. 3 includes a plurality of neurons, such as neurons 31 and 32. Neurons at a first layer receive different input feature parameters x1, x2, x3, and x4 and deliver them to the second layer. Neuron 31 at the second layer separately corresponds to operation units. Operation units can use x1, x2, x3, and x4 at the first layer as inputs. The features x1, x2, x3, and x4 are provided by a sample or extracted from the sample, and can separately be, for example, parameters such as a color, a shape, and a size of a fruit. Similarly, neuron 32 at the third layer is an operation unit that uses output values of neuron 31 and other neurons at the second layer as inputs. A connection between every two neurons represents a weight value for a signal passing the connection, which is referred to as a weight. Through neuron 32, the neural network model can obtain an output result, for example, a tangerine or an orange.

Figure 4:
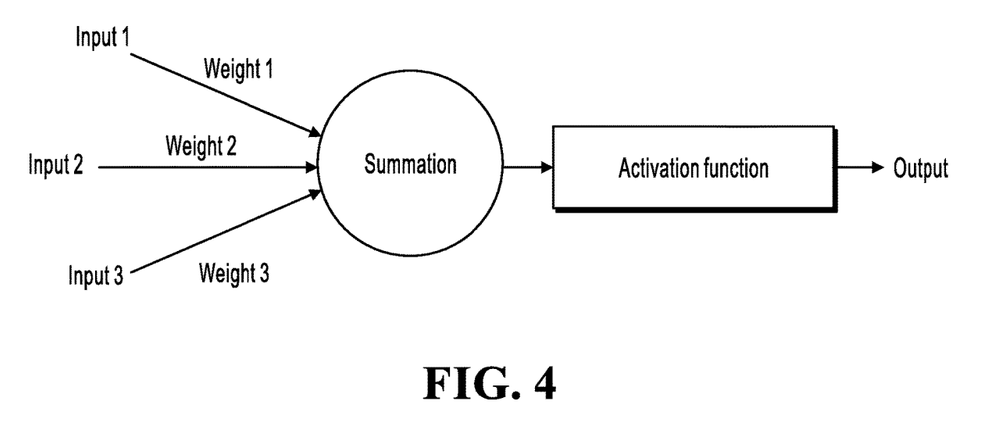
FIG. 4 illustrates a specific example of a neuron of a neural network model.

Further, as shown in FIG. 4, each neuron represents a specific output function, which is referred to as an activation function (for example, a sigmoid function $f(z)=1/(1+e-z)$). In the neuron shown in FIG. 4, the output function can be $H=f(i_{i=1}^{3} W_i x_i)$. For $W_i$, a value of i ranges from 1 to 3, which respectively represents weight 1, weight 2, and weight 3. For x1, a value of i ranges from 1 to 3, which respectively represents feature parameter 1, feature parameter 2, and feature parameter 3. After weighted summation is performed on feature parameter 1, feature parameter 2, and feature parameter 3, an output of the neuron can be obtained through mapping by using the activation function.

The plurality of to-be-tested models in the model set of the implementation include the at least one neural network model. The to-be-tested models are pre-trained by using a training sample set. The training sample set can include samples and corresponding known output results. Model parameters (for example, weight 1 in FIG. 4) can be adjusted based on input feature parameters and known output results that are determined based on the samples in the training sample set, until a model achieves a desired accuracy for the training sample set, and model parameters can be determined. However, due to a limitation of the training sample set, the model further needs to be tested by using a test sample set.

In practice, the model set can be a model collection. When the model test method is executed by a test-type platform, the platform can include a model operation module, and a user can add to-be-tested models by using the module, so as to form the previous model set. Although the samples in the test sample set can be applied to all the to-be-tested models, the to-be-tested models can have a same function or can have different functions, depending on a purpose and a specific circumstance of the test. For example, for a same picture sample, one to-be-tested model can identify a category, etc. based on various color and appearance features of trees and flowers, and another to-be-tested model can identify a season, etc. based on color features of trees and flowers.

It can be understood that the to-be-tested models each can obtain an output result based on an input sample. For a same sample, the output results of the to-be-tested models might be different. For example, for a same picture sample, models with different functions outputs a category "maple leaf" and a season "autumn" separately. For models with a same function, because the models have different accuracies, output results are different. For example, for a same picture sample, one outputs "spring" and another outputs "summer". In an implementation, the plurality of to-be-tested models all include a same function.

Then, in step 23, the test result is determined based on the output results. It can be understood that the test result of the models is determined by using the output results obtained after the sample is input to the models. The specific test result depends on test content.

Specifically, according to an aspect of the implementation, the test content can be output result accuracies corresponding to the to-be-tested models. For ease of description, the output result accuracies corresponding to the to-be-tested models are referred to as the first test results. The first test results can be specific descriptions of the output result accuracies. For example, the first test results can be either of the following: The results of the to-be-tested models are accurate and the results of the to-be-tested models are inaccurate; or the first test results can be accuracy rates (a quantity of accurate output results/a total quantity of determining times) calculated by collecting statistics about whether the plurality of output results of the to-be-tested models are correct.

In an implementation, for to-be-tested models with a same function included in the plurality of to-be-tested models, a correct output result can be determined by voting, and each output result is a vote result of a corresponding model. An output result with the largest quantity of votes is the correct output result. Then, it can be determined that an output result of the to-be-tested model whose output result is the correct output result is accurate. For example, assuming that there are 10 to-be-tested models in the model set, and 7 to-be-tested models can be used to identify seasons based on color features of trees and flowers. In this case, the 7 to-be-tested models have a same function. For a certain picture sample, if output results of the 7 to-be-tested models are "spring", "spring", "summer", "autumn", "spring", "autumn", and "spring", a voting result is as follows: 4 votes for "spring", 1 vote for "summer", and 2 votes for "autumn". Therefore, "spring" with the largest quantity of votes is the correct output result. Then, it is determined that output results of the first, second, fifth, and seventh models are accurate, and output results of the third, fourth, and sixth models are inaccurate. For the other 3 to-be-tested models, if they have a same function, when test content is output result accuracies, a similar method can be used for processing. Details are omitted here for simplicity. In a possible design, all to-be-tested models in the model set have a same function.

In another implementation, the model set can include a standard model. In this case, a correct output result of a to-be-tested model with a same function as the standard model can be determined based on an output result of the standard model, and it can be determined that an output result of the to-be-tested model whose output result is the correct output result is accurate. The standard model can be a tested model with a relatively high accuracy, for example, a 99.99% accuracy. Therefore, the output result of the standard model can be determined as the correct output result. In this case, for a portrait picture sample, when the output result determined by the standard model is "man", if output results of 4 among 7 to-be-tested models with a same function as the standard model are "woman" and output results of the other 3 among the 7 to-be-tested models are "man", it can be determined that the output results of the 3 to-be-tested models whose output results are "man" are accurate.

In a possible design, when the output results of the to-be-tested models with a same function as the standard model are all inconsistent with the output result of the standard model, it can further be detected whether the output results of these to-be-tested models are consistent. If yes, the consistent result can be determined as the correct output result. For example, for a portrait picture sample, the output result determined by the standard model is "man", but the output results of the 7 to-be-tested models with a same function as the standard model are all "woman". In this case, it can be determined that a correct output result is "woman". As the standard model is not necessarily accurate, such practice can prevent a judgment error of the to-be-tested model when the output result of the standard model is incorrect.

For another to-be-tested model with a different function from the standard model, a test result can also be determined in a way of determining the correct output result by voting, and details are omitted here for simplicity. Optionally, all the to-be-tested models in the model set can have a same function as the standard model.

In an implementation, the first test result can also be an output result accuracy of a certain sample in the test. For example, for a sample, output results of 4 models are accurate, and output results of 3 models are inaccurate, etc. Optionally, an accuracy of the sample can be further calculated. For a single test process, a sample accuracy=a quantity of models with correct output results/a total quantity of models. For a plurality of test processes of the sample, the accuracy can be an average value of single-time accuracies, or can be calculated based on a total quantity of times that the to-be-tested models output correct results/a total quantity of times that the to-be-tested models perform execution and output results. As such, the sample can be evaluated for its usefulness in the model test process. When the output results of the models are all correct in each test of a sample, the sample has little significance to the model test.

In another aspect, the test content can be a neuron coverage rate of the at least one neural network model. For ease of description, the neuron coverage rate of the at least one neural network model is referred to as the second test result. It can be easily understood that a neuron coverage rate of a model can be used to represent a proportion of a quantity of activated neurons in a total quantity of neurons. In this case, it can be detected whether an output of each neuron in the at least one neural network model satisfies an output condition, and a quantity of covered neurons of each neural network model can be counted. The quantity of covered neurons includes a quantity of neurons that satisfy the output condition in the test process. A neuron coverage rate of each neural network model can be determined based on the quantity of covered neurons. The neuron coverage rate is positively correlated with a ratio of the quantity of covered neurons to a total quantity of neurons.

It can be understood that, in the neural network model, an activation function is also referred to as a firing rule, which is similar to operating of a human brain and can generate an output only when an input exceeds a specific standard. Therefore, in a sample, if values of some feature parameters of the sample are relatively small, a neuron cannot generate an output based only on these feature parameters, that is, the neuron is not activated. Therefore, a threshold can be set as an output condition of a neuron, for example, the output condition can be set to that an output of a neuron is greater than 0.

It should be noted that the quantity of covered neurons is the quantity of neurons that satisfy the output condition in the test process. For example, model 1 has a total of 50 neurons. When sample 1 is input into model 1 and the first to the fifth neurons satisfy the output condition, the quantity of covered neurons is 5, and the neuron coverage rate is a number that is positively correlated with 5/50, for example, a percentage 10%. When sample 2 is input into model 1 and the second to the sixth neurons satisfy the output condition, neurons that satisfies the output condition are the first to the sixth neurons. In this case, the quantity of covered neurons is 6, and the neuron coverage rate is a number that is positively correlated with 6/50, for example, a percentage 12%.

In conclusion, the test result can include at least one of the first test result and the second test result. The first test result includes the output result accuracies corresponding to the to-be-tested models, and the second test result includes the neuron coverage rate of the at least one neural network model.

Subsequently, in step 24, when the test result does not satisfy the predetermined condition, a new sample can be generated based on the sample and the predetermined rule, and the new sample can be added to the test sample set. Here, the predetermined condition can be stored, and used to limit an end time of the model test process. In this step, it can be further detected whether the test result in step 23 satisfies the predetermined condition, and if yes, the model test process can be stopped. If the test result does not satisfy the predetermined condition, the sample can be processed based on the predetermined rule to generate a new sample, and the new sample can be added to the test sample set to expand the test sample set for a subsequent test process. For example, processing on the sample can be changing values of features based on the predetermined rule (for example, a gradient ascending algorithm).

In an implementation, the predetermined condition is determined based on the neuron coverage rate. Specifically, when the test result includes the second test result, the predetermined condition can include the following: The neuron coverage rate of the at least one neural network model each is greater than a predetermined coverage rate threshold. To be specific, if the to-be-tested models include a neural network model, a neuron coverage rate of the neural network model needs to be greater than the predetermined coverage rate threshold. If the to-be-tested models include a plurality of neural network models, a neuron coverage rate of each neural network model needs to be greater than the predetermined coverage rate threshold. The predetermined coverage rate threshold can be used to limit a coverage degree of a sample for the model test, for example, 99%. When the neuron coverage rate exceeds the predetermined coverage rate threshold, it indicates that the sample in the test sample set can adequately test most of neurons in the models.

In some other implementations, the predetermined condition can further be set based on test result accuracies. Specifically, the predetermined condition can further include the following: Output result accuracies corresponding to the plurality of to-be-tested models each are greater than a predetermined accuracy threshold, and the accuracies are positively correlated with a ratio of a quantity of accurate historical test results to a total quantity of tests. As an example, in the current model test, model 1 passes a test of 100 samples, where a quantity of accurate output results is 50, and an accuracy of model 1 is positively correlated with 50/100, for example, a percentage 50%. Assuming that the predetermined accuracy threshold is 90%, the test can be ended when an accuracy of each to-be-tested model in the model set is greater than 90%. If a test is performed a relatively small quantity of times, the test has little significance to evaluation of a model accuracy. For example, when the model test method is executed once, for a single sample, the model accuracy is either 0 or 100%. Therefore, in an optional implementation, a quantity of times can be further limited for accuracy statistics collection. For example, for a certain to-be-tested model, an accuracy of the to-be-tested model can be calculated only after at least 100 cycles are performed.

In an implementation, for each to-be-tested model, it can be further determined whether the predetermined condition is satisfied, for example, the accuracy reaches the predetermined accuracy threshold, or the neuron coverage rate reaches the predetermined coverage rate threshold. When the accuracy reaches the predetermined accuracy threshold, it indicates that performance of the to-be-tested model is relatively good, and there is little significance to continue the test, and the to-be-tested model can be directly removed from the model set. When the neuron coverage rate reaches the predetermined coverage rate threshold, it indicates that defects or problems in the to-be-tested model can already be adequately identified through the current test, and the to-be-tested model can also be removed from the model set. As such, a to-be-tested model that has finished the test can be removed in time, and data processing load of a model test body can be reduced.

In an implementation, when the model test process is executed, a new to-be-tested model can be added at any time to perform the test. As such, execution resources for the model test can be saved.

When the test is continued, as described above, the current sample can be processed based on the predetermined rule to generate a new sample and the new sample can be added to the sample set. The above predetermined rules can be set by the test personnel as needed, in consideration of the following: On one hand, not any value can be set for each feature of the sample, and some extreme values make the sample meaningless, for example, a face width exceeding twice a face length, an eye area accounting for three quarters of a face area, etc. On the other hand, the test personnel can generate samples under specific conditions to perform more targeted tests. For example, by setting the predetermined rule, a truck color in a current picture sample can be set as a specific color, for example, white, so as to test an identification status of various vehicle colors and backgrounds in a case of identification upon self-driving.

In an implementation, a constraint range of a sample feature can be set based on the predetermined rule. For example, a pixel range can be set to 128×128–16384×16384, etc. Further, a random error term can be added to the sample based on the specified range of each feature to generate a new sample. The random error term can change only an original feature of the sample, or can add a new feature related to an input of the to-be-tested model to the sample. For example, a to-be-tested model identifies a season based on a picture color, and a color of each pixel of a picture sample is represented by using an RGB value as [(235,108,0),(199,98,3),(153,72,20), . . . ]. Because a value of each pixel ranges from 0 to 255, the random error term can make a changed value of each pixel to fall in the range 0-255, for example, [(0,1,30),(26,0,3),(−153,72,20), . . . ], and the random error term can be added to the original sample to generate anew sample [(235,109,30),(255,98,6),(0,144,40), . . . ]. The random error term can add a pixel to a sample in a pixel range. For example, an original sample has 128×128 pixels, and the random error term can add 128×256 pixels, so that a new sample has 128×384 pixels.

As such, a new sample that is different from the manually collected samples can be automatically generated, so as to reduce complex manual collection. Further, a feature value range can be manually set, so that the generated new sample is more realistic.

In an implementation, samples that have been used to test the models can be retained in the test sample set for use in a subsequent test process. In some other possible implementations, a sample with a relatively high accuracy in each sample test has little significance to the model test, and can further be removed from the test sample set. For example, a certain sample can be removed from the test sample set when all the to-be-tested models can provide correct output results each time the sample is used for testing. In practice, a threshold can be specified, and when the accuracy is greater than the specified threshold, the sample can be removed from the test sample set.

As described in the previous process, a sample is first obtained from a test sample set; next, the sample is input into a plurality of to-be-tested models included in a model set to obtain output results of the to-be-tested model; subsequently, a test result is determined based on the output results; and further, when the test result does not satisfy a predetermined condition, a new sample is generated based on the sample and a predetermined rule, and the new sample is added to the test sample set. As such, when the model test method is cyclically executed, on one hand, accuracies and/or test adequacy of the to-be-tested models can be evaluated, and on the other hand, a new sample that is generated based on the original sample and that is different from the original sample can be used to improve effectiveness of a model test. Such practice not only can reduce manpower waste caused by manual sample collection but also can further test models. Moreover, an expanded test sample set can be used to train the models to improve a model accuracy.

Figure 5:
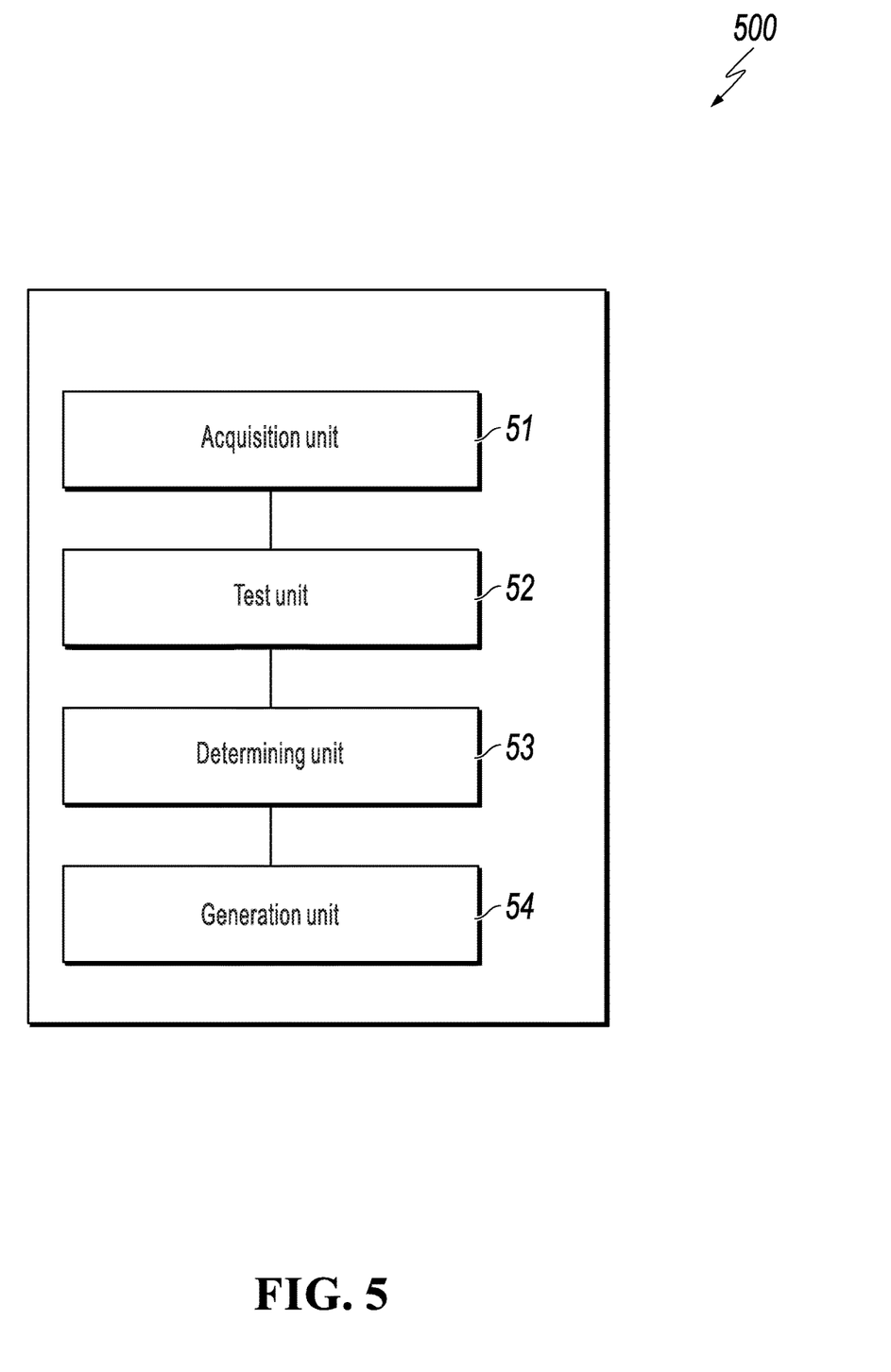
FIG. 5 is a schematic block diagram illustrating a model test apparatus, according to an implementation.

According to an implementation of another aspect, a model test apparatus is further provided. FIG. 5 is a schematic block diagram illustrating a model test apparatus, according to an implementation. As shown in FIG. 5, the model test apparatus 500 includes the following: an acquisition unit 51, configured to obtain a sample from a test sample set; a test unit 52, configured to input the sample into a plurality of to-be-tested models included in a model set to obtain output results of the to-be-tested models, where the plurality of to-be-tested models include at least one neural network model; a determining unit 53, configured to determine a test result based on the output results, where the test result includes at least one of a first test result or a second test result, the first test result includes output result accuracies corresponding to the to-be-tested models, and the second test result includes a neuron coverage rate of the at least one neural network model; and a generation unit 54, configured to, when the test result does not satisfy a predetermined condition, generate a new sample based on the sample and a predetermined rule, and add the new sample to the test sample set.

According to an implementation method of the another aspect, when the test result includes the first test result, the determining unit 53 further includes the following: a result determining module (not shown), configured to determine, through voting, a correct output result for to-be-tested models with a same function included in the plurality of to-be-tested models, where an output result with the largest quantity of votes is the correct output result; and an accuracy determining module (not shown), configured to determine that an output result of a to-be-tested model whose output result is the correct output result is accurate.

In a possible design, the model set includes a standard model, and the determining unit 53 includes the following: a result determining module (not shown), configured to determine, based on an output result of the standard model, a correct output result of a to-be-tested model that has a same function as the standard model; and an accuracy determining module (not shown), configured to determine that an output result of a to-be-tested model whose output result is the correct output result is accurate.

According to an implementation method of the another aspect, when the test result includes the second test result, the determining unit further includes the following: a counting module (not shown), configured to count a quantity of covered neurons of each neural network model based on whether an output of each neuron in the at least one neural network model satisfies an output condition, where the quantity of covered neurons includes a quantity of neurons that satisfy the output condition in a test process; and a coverage rate determining module, configured to determine a neuron coverage rate of each neural network model based on the quantity of covered neurons, where the neuron coverage rate is positively correlated with a ratio of the quantity of covered neurons to a total quantity of neurons.

Further, when the test result includes the second test result, the predetermined condition includes the following: the neuron coverage rate of the at least one neural network model each is greater than a predetermined coverage rate threshold.

Still further, the predetermined condition can further include the following: the output result accuracies corresponding to the plurality of to-be-tested models each are greater than a predetermined accuracy threshold. The accuracy can be positively correlated with a ratio of a quantity of accurate historical test results to a total quantity of tests.

In an implementation, the generation unit 54 is further configured to obtain a specified range of each feature in the sample; and add a random error term to the sample based on the specified range of each feature to generate the new sample.

In a possible design, the apparatus 500 further includes one or more of the following: a removing unit (not shown), configured to remove a to-be-tested model whose test result satisfies the predetermined condition from the model set; and an adding unit (not shown), configured to add a new to-be-tested model to the model set.

With the apparatus, samples can be continuously obtained from a test sample set to cyclically execute a model test method and more different samples can be generated, so as to greatly improve effectiveness of a model test. In addition, the generated different samples can be further used to train models, so as to improve accuracies of the models.

According to an implementation of another aspect, a computer-readable storage medium is further provided, where the computer-readable storage medium stores a computer program, and when the computer program runs on a computer, the computer is enabled to perform the method described with reference FIG. 2.

According to an implementation of still another aspect, a computing device is further provided, including a memory and a processor, where the memory stores executable code, and when the processor executes the executable code, the method described with reference FIG. 2 can be implemented.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for testing image recognition models, comprising:
    obtaining a sample image from a test sample set;
    inputting the sample image into a plurality of image recognition models comprised in a model set that are to be tested, wherein the plurality of image recognition models comprise at least one neural network model;
    obtaining a plurality of output results, comprising obtaining, from each model of the plurality of image recognition models, a respective output result;
    determining, based on the plurality of output results, whether a test result satisfies a predetermined condition, wherein the test result comprises at least one of a first test result or a second test result, wherein the first test result comprises a plurality of output result accuracies, wherein each output result accuracy of the plurality of output result accuracies corresponds to a respective model of the plurality of image recognition models, and wherein the second test result comprises at least one neuron coverage rate corresponding to the at least one neural network model;
    in response to determining that the test result does not satisfy the predetermined condition:
        generating, based on the sample image and a predetermined rule, a new sample image, comprising:
            identifying a specified range corresponding to a feature of the sample image; and
            generating a new sample image by adding, based on the specified range, a random error term to one or more values associated with the feature of the sample image; and
        adding the new sample image to the test sample set; and
    in response to determining that the test result satisfies the predetermined condition:
        removing the plurality of image recognition models from the model set.

2. The computer-implemented method according to claim 1, wherein the test result comprises the first test result, and wherein determining the test result comprises:
    determining, through voting, a correct output result for an additional plurality of image recognition models that are of the same function and that are comprised in the plurality of image recognition models, wherein an output result having the most votes is the correct output result; and
    in response to determining that a particular output result of a particular model matches the correct output result, determining that the particular output result of the particular model is accurate.

3. The computer-implemented method according to claim 1, wherein the model set comprises a standard model, and wherein determining the test result comprises:
    determining, based on an output result of the standard model, a correct output result for a particular model of the plurality of image recognition models, wherein the particular model has the same function as the standard model; and
    in response to determining that a particular output result of the particular model matches the correct output result, determining that the particular output result of the particular model is accurate.

4. The computer-implemented method according to claim 1, wherein the test result comprises the second test result, wherein determining the test result comprises:
    for each neural network model of the at least one neural network model:
        determining, based on whether a respective output of each neuron in the each neural network model satisfies an output condition, a quantity of covered neurons, wherein the quantity of covered neurons is a quantity of neurons that satisfy the output condition; and
        determining, based on the quantity of covered neurons, a neuron coverage rate of the each neural network model, wherein the neuron coverage rate is positively correlated with a ratio of the quantity of covered neurons to a total quantity of neurons of the each neural network model among the at least one neural network model.

5. The computer-implemented method according to claim 4, wherein the predetermined condition comprises:
    each neuron coverage rate of the at least one neuron coverage rate is greater than a predetermined coverage rate threshold.

6. The computer-implemented method according to claim 5, wherein the predetermined condition further comprises:

each output result accuracy of the plurality of output result accuracies is greater than a predetermined accuracy threshold.

7. A non-transitory, computer-readable medium storing one or more instructions executable by a computer system to perform operations comprising:
   obtaining a sample image from a test sample set;
   inputting the sample image into a plurality of image recognition models comprised in a model set that are to be tested, wherein the plurality of image recognition models comprise at least one neural network model;
   obtaining a plurality of output results, comprising obtaining, from each model of the plurality of image recognition models, a respective output result;
   determining, based on the plurality of output results, whether a test result satisfies a predetermined condition, wherein the test result comprises at least one of a first test result or a second test result, wherein the first test result comprises a plurality of output result accuracies, wherein each output result accuracy of the plurality of output result accuracies corresponds to a respective model of the plurality of image recognition models, and wherein the second test result comprises at least one neuron coverage rate corresponding to the at least one neural network model;
   in response to determining that the test result does not satisfy the predetermined condition:
      generating, based on the sample image and a predetermined rule, a new sample image, comprising:
         identifying a specified range corresponding to a feature of the sample image; and
         generating a new sample image by adding, based on the specified range, a random error term to one or more values associated with the feature of the sample image; and
      adding the new sample image to the test sample set; and
   in response to determining that the test result satisfies the predetermined condition:
      removing the plurality of image recognition models from the model set.

8. The non-transitory, computer-readable medium according to claim 7, wherein the test result comprises the first test result, and wherein determining the test result comprises:
   determining, through voting, a correct output result for an additional plurality of image recognition models that are of the same function and that are comprised in the plurality of image recognition models, wherein an output result having the most votes is the correct output result; and
   in response to determining that a particular output result of a particular model matches the correct output result, determining that the particular output result of the particular model is accurate.

9. The non-transitory, computer-readable medium according to claim 8, wherein the model set comprises a standard model, and wherein determining the test result comprises:
   determining, based on an output result of the standard model, a correct output result for a particular model of the plurality of image recognition models, wherein the particular model has the same function as the standard model; and
   in response to determining that a particular output result of the particular model matches the correct output result, determining that the particular output result of the particular model is accurate.

10. The non-transitory, computer-readable medium according to claim 7, wherein the test result comprises the second test result, wherein determining the test result comprises:
    for each neural network model of the at least one neural network model:
       determining, based on whether a respective output of each neuron in the each neural network model satisfies an output condition, a quantity of covered neurons, wherein the quantity of covered neurons is a quantity of neurons that satisfy the output condition; and
       determining, based on the quantity of covered neurons, a neuron coverage rate of the each neural network model, wherein the neuron coverage rate is positively correlated with a ratio of the quantity of covered neurons to a total quantity of neurons of the each neural network model among the at least one neural network model.

11. The non-transitory, computer-readable medium according to claim 10, wherein the predetermined condition comprises:
    each neuron coverage rate of the at least one neuron coverage rate is greater than a predetermined coverage rate threshold.

12. The non-transitory, computer-readable medium according to claim 11, wherein the predetermined condition further comprises:
    each output result accuracy of the plurality of output result accuracies is greater than a predetermined accuracy threshold.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       obtaining a sample image from a test sample set;
       inputting the sample image into a plurality of image recognition models comprised in a model set that are to be tested, wherein the plurality of image recognition models comprise at least one neural network model;
       obtaining a plurality of output results, comprising obtaining, from each model of the plurality of image recognition models, a respective output result;
       determining, based on the plurality of output results, whether a test result satisfies a predetermined condition, wherein the test result comprises at least one of a first test result or a second test result, wherein the first test result comprises a plurality of output result accuracies, wherein each output result accuracy of the plurality of output result accuracies corresponds to a respective model of the plurality of image recognition models, and wherein the second test result comprises at least one neuron coverage rate corresponding to the at least one neural network model;
       in response to determining that the test result does not satisfy the predetermined condition:
          generating, based on the sample image and a predetermined rule, a new sample image, comprising:
             identifying a specified range corresponding to a feature of the sample image; and generating a new sample image by adding, based on the specified range, a random error term to one or more values associated with the feature of the sample image; and adding the new sample image to the test sample set; and in response to determining that the test result satisfies the predetermined condition:

removing the plurality of image recognition models from the model set.

14. The computer-implemented system according to claim 13, wherein the test result comprises the first test result, and wherein determining the test result comprises:

determining, through voting, a correct output result for an additional plurality of image recognition models that are of the same function and that are comprised in the plurality of image recognition models, wherein an output result having the most votes is the correct output result; and in response to determining that a particular output result of a particular model matches the correct output result, determining that the particular output result of the particular model is accurate.

15. The computer-implemented system according to claim 13, wherein the model set comprises a standard model, and wherein determining the test result comprises:

determining, based on an output result of the standard model, a correct output result for a particular model of the plurality of image recognition models, wherein the particular model has the same function as the standard model; and in response to determining that a particular output result of the particular model matches the correct output result, determining that the particular output result of the particular model is accurate.

16. The computer-implemented system according to claim 13, wherein the test result comprises the second test result, wherein determining the test result comprises:

for each neural network model of the at least one neural network model:

determining, based on whether a respective output of each neuron in the each neural network model satisfies an output condition, a quantity of covered neurons, wherein the quantity of covered neurons is a quantity of neurons that satisfy the output condition; and determining, based on the quantity of covered neurons, a neuron coverage rate of the each neural network model, wherein the neuron coverage rate is positively correlated with a ratio of the quantity of covered neurons to a total quantity of neurons of the each neural network model among the at least one neural network model.

17. The computer-implemented system according to claim 16, wherein the predetermined condition comprises:

each neuron coverage rate of the at least one neuron coverage rate is greater than a predetermined coverage rate threshold.

18. The computer-implemented system according to claim 17, wherein the predetermined condition further comprises:

each output result accuracy of the plurality of output result accuracies is greater than a predetermined accuracy threshold.

* * * * *